(12) United States Patent
Chen et al.

(10) Patent No.: US 11,578,992 B2
(45) Date of Patent: Feb. 14, 2023

(54) METHOD FOR UPDATING STRAPDOWN INERTIAL NAVIGATION SOLUTIONS BASED ON LAUNCH-CENTERED EARTH-FIXED FRAME

(71) Applicant: NORTHWESTERN POLYTECHNICAL UNIVERSITY, Xi'an (CN)

(72) Inventors: Kai Chen, Xi-An (CN); Hanyan Sun, Xi'An (CN); Hongyu Zhang, Xi'An (CN); Mingxin Liu, Xi'An (CN)

(73) Assignee: NORTHWESTERN POLYTECHNICAL UNIVERSITY, Xi'an (CN)

( * ) Notice: Subject to any disclaimer, the term of this patent is extended or adjusted under 35 U.S.C. 154(b) by 321 days.

(21) Appl. No.: 16/857,132

(22) Filed: Apr. 23, 2020

(65) Prior Publication Data
US 2020/0386574 A1 Dec. 10, 2020

(30) Foreign Application Priority Data
Apr. 23, 2019 (CN) .......................... 201910329315.3

(51) Int. Cl.
G01C 25/00 (2006.01)
F41G 7/36 (2006.01)
G01C 21/16 (2006.01)
G06F 17/16 (2006.01)

(52) U.S. Cl.
CPC .............. *G01C 25/005* (2013.01); *F41G 7/36* (2013.01); *G01C 21/16* (2013.01); *G06F 17/16* (2013.01)

(58) Field of Classification Search
CPC ......... F41G 7/36; G01C 21/16; G01C 25/005; G06F 17/16
See application file for complete search history.

(56) References Cited

U.S. PATENT DOCUMENTS

| 5,485,384 A * | 1/1996 | Falconnet | G01C 21/165 701/445 |
| 6,424,914 B1 * | 7/2002 | Lin | G01S 19/44 701/472 |
| 2004/0155142 A1 * | 8/2004 | Muravez | F41G 7/2213 244/3.1 |
| 2011/0167893 A1 * | 7/2011 | Frey, Jr. | G01C 21/165 73/1.77 |

* cited by examiner

*Primary Examiner* — Eman A Alkafawi
*Assistant Examiner* — Aeysha N Sultana
(74) *Attorney, Agent, or Firm* — Bayramoglu Law Offices LLC

(57) ABSTRACT

The present invention relates to a method for updating strapdown inertial navigation solutions based on a launch-centered earth-fixed (LCEF) frame (g frame). The present invention uses the g frame as a navigation reference frame of a medium-to-short-range surface-to-surface missile. This is beneficial to establish a relative relationship between the missile and the ground so as to keep the same missile parameters required by a missile control and guidance system. The calculation of a navigation algorithm in the g frame is moderate, which is suitable for an embedded system.

1 Claim, 1 Drawing Sheet

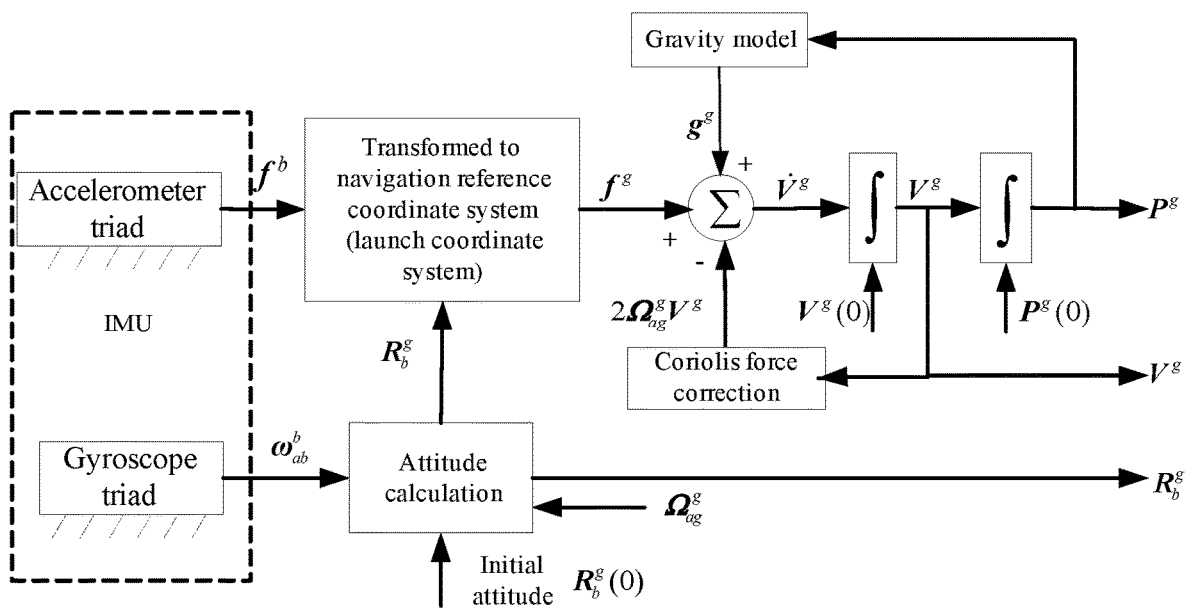

METHOD FOR UPDATING STRAPDOWN INERTIAL NAVIGATION SOLUTIONS BASED ON LAUNCH-CENTERED EARTH-FIXED FRAME

TECHNICAL FIELD

The present invention belongs to the field of flight vehicle navigation, guidance and control, and relates to a reference frame for a flight vehicle navigation algorithm, in particular to a method for updating strapdown inertial navigation solutions based on a launch-centered earth-fixed (LCEF) frame.

BACKGROUND

A suitable navigation reference frame is conducive to the design and application of the flight vehicle navigation and guidance system. The local level (LL) frame describes the attitude and position of the carrier in the near-space motion, and the launch-centered inertial (LCI) frame (a frame) describes the attitude and position of the ballistic missile and the carrier rocket. The LCEF frame can be used to establish a motion equation of the rocket relative to the ground, and is suitable for medium-to-short-range surface-to-surface missiles. It is possible to choose the LCEF frame as the navigation coordinate system to quickly resolve the attitude and position of the missile relative to the launch point, which is beneficial to the data interaction with the flight control and guidance system. The methods for updating the strapdown inertial navigation solutions based on the LL/LCI frame are mature, but there is no perfect method for updating the strapdown inertial navigation solutions based on the LCEF frame.

SUMMARY

The present invention provides a method for updating strapdown inertial navigation solutions in a launch-centered earth-fixed (LCEF) frame, which fills in the gap of the prior art. The present invention uses the LCEF frame as a navigation reference frame of a medium-to-short-range surface-to-surface missile (SSM). This is beneficial to establish a relative relationship between the missile and the ground so as to keep the same missile parameters required by a missile control and guidance system. The calculation of a navigation algorithm in the LCEF frame is moderate, which is suitable for an embedded system.

A method for updating strapdown inertial navigation solutions based on an LCEF frame (g frame) includes the following steps:

step 1, using a surface-to-surface missile (SSM) as a body, and establishing a body frame (b frame), which points front, top, and right;

step 2: expressing a navigation equation in the g frame as:

$$\begin{bmatrix} \dot{P}^g \\ \dot{V}^g \\ \dot{R}^g_b \end{bmatrix} = \begin{bmatrix} V^g \\ R^g_b f^b - 2\Omega^g_{ag} V^g + g^g \\ R^g_b (\Omega^b_{ab} - \Omega^b_{ag}) \end{bmatrix}$$

where, $P^g$, $V^g$ and $R^g_b$ are position, velocity and attitude matrices of the body in the g frame, and the corresponding equations are position, velocity and attitude navigation equations; $f^b$ is a measured value of an accelerometer triad; $g^g$ is a gravity of the body in the g frame; $\Omega^b_{ab}$ is an anti-symmetric matrix corresponding to a measured value $\omega^b_{ab}$ of a gyroscope triad; $\Omega^b_{ag}$ is an anti-symmetric matrix corresponding to a rotational angular velocity $\omega^b_{ag}$ of the g frame relative to an a frame;

step 3: performing attitude update on the SSM, including the following sub-steps:

step 3-1: resolving the attitude navigation equation in step 2 by a quaternion method:

$$q_{b(m)}^{g(m)} = q_{g(m-1)}^{g(m)} q_{b(m-1)}^{g(m-1)} q_{b(m)}^{b(m-1)}$$

where, $q_{b(m-1)}^{g(m-1)}$ is a transformation quaternion from the b frame to the g frame at a $t_{m-1}$ moment, that is, an attitude quaternion at $t_{m-1}$; $q_{b(m)}^{g(m)}$ is an attitude quaternion at $t_m$; $q_{g(m-1)}^{g(m)}$ is a transformation quaternion of the g frame from $t_{m-1}$ to $t_m$; $q_{b(m)}^{b(m-1)}$ is a transformation quaternion calculated from an angular increment from $t_{m-1}$ to $t_m$;

step 3-2: calculating with an equivalent rotation vector method, where an equivalent rotation vector $\zeta_m$ of the g frame from $t_{m-1}$ to $t_m$ is expressed as:

$$\zeta_m = \int_{t_{m-1}}^{t_m} \omega^g_{ag}(t) dt \approx \omega^g_{ag} T$$

an equivalent rotation vector $\Phi_m$ of the body frame relative to the inertial frame from $t_{m-1}$ to $t_m$ is expressed as:

$$\Phi_m = \int_{t_{m-1}}^{t_m} \omega^b_{ab}(t) dt$$

step 3-3: applying the angular increment measured by the gyroscope triad to an actual project to calculate:

$$\Phi_m = \Delta\theta_1 + \Delta\theta_2 + \frac{2}{3}(\Delta\theta_1 \times \Delta\theta_2) \quad (0.1)$$

where $$\Delta\theta_1 = \int_{t_{m-1}}^{t_{m-1}+\frac{T}{2}} \omega^b_{ab}(\tau) d\tau, \Delta\theta_2 = \int_{t_{m-1}+\frac{T}{2}}^{t_m} \omega^b_{ab}(\tau) d\tau;$$

a rotation vector $\Phi$ and a corresponding quaternion q(h) have the following calculation relationship:

$$q(h) = \cos\frac{\Phi}{2} + \frac{\Phi}{\Phi} \sin\frac{\Phi}{2} \quad (0.2)$$

thus quaternions $q_{g(m-1)}^{g(m)}$ and $q_{b(m)}^{b(m-1)}$ corresponding to $\zeta_m$ and $\Phi_m$ in are obtained, and substituted into $q_{b(m)}^{g(m)} = q_{g(m-1)}^{g(m)} q_{b(m-1)}^{g(m-1)} q_{b(m)}^{b(m-1)}$ to complete attitude update;

step 4: performing velocity update on the SSM, including the following sub-steps:

step 4-1: integrating the velocity navigation equation in step 2 over a period $[t_{m-1}, t_m]$:

$$V^g_m = V^g_{m-1} + \Delta V^g_{sf(m)} + \Delta V^g_{cor/g(m)}$$

where, $V_m^g$ and $V_{m-1}^g$ are the velocity of the SSM in the g frame at $t_m$ and $t_{m-1}$; $\Delta V_{sf(m)}^g$ and $\Delta V_{cor/g(m)}^g$ are a specific force velocity increment and a velocity increment of a harmful acceleration of the navigation coordinate system in the period $T=t_m-t_{m-1}$;

Step 4-2: substituting $\Delta V_{cor/g(m)}^g$ with a value at $t_{m-1/2}=(t_{m-1}+t_m)/2$:

$$\Delta V_{cor/g(m)}^g \approx [-2\omega_{ag(m-1/2)}^g \times V_{m-1/2}^g + g_{m-1/2}^g]T;$$

performing matrix chain multiplication and decomposition on $\Delta V_{sf(m)}^g$:

$$\Delta V_{sf(m)}^g = R_{b(m-1)}^{g(m-1)}\Delta V + R_{b(m-1)}^{g(m-1)}(\Delta V_{rot(m)} + \Delta V_{scul(m)}) - (\Delta V'_{rot(m)} + \Delta V'_{scul(m)})$$

where $R_{b(m-1)}^{g(m-1)}$ is an attitude matrix at $t_{m-1}$; $\Delta V$ is an integral of a measured value of the accelerometer triad in T; $\Delta V_{rot(m)}$ and $\Delta V'_{rot(m)}$ are rotation error compensation quantities of velocity; $\Delta V_{scul(m)}$ and $\Delta V'_{scul(m)}$ are scull error compensation quantities;

step 4-3: expressing $\Delta V_{sf(m)}^g$ by an angular velocity increment and a velocity increment at $t_{m-1/2}$ and $t_m$, and setting:

$$\begin{cases} \Delta\theta_1 = \int_{t_{m-1}}^{t_{m-1}+T/2} \omega_{ab}^b(\tau)d\tau \\ \Delta\theta_2 = \int_{t_{m-1}+T/2}^{t_m} \omega_{ab}^b(\tau)d\tau \\ \Delta V_1 = \int_{t_{m-1}}^{t_{m-1}+T/2} f^b(\tau)d\tau \\ \Delta V_2 = \int_{t_{m-1}+T/2}^{t_m} f^b(\tau)d\tau \\ \Delta\theta = \int_{t_{m-1}}^{t_m} \omega_{ab}^b(\tau)d\tau \\ \Delta V = \int_{t_{m-1}}^{t_m} f^b(\tau)d\tau \end{cases}$$

$$\begin{cases} \Delta\theta'_1 = \int_{t_{m-1}}^{t_{m-1}+T/2} \omega_{ag}^g(\tau)d\tau \approx \frac{T}{2}\omega_{ag}^g \\ \Delta\theta'_2 = \int_{t_{m-1}+T/2}^{t_m} \omega_{ag}^g(\tau)d\tau \approx \frac{T}{2}\omega_{ag}^g \\ \Delta V'_1 = \int_{t_{m-1}}^{t_{m-1}+T/2} R_{b(m-1)}^{g(m-1)} f^b(\tau)d\tau = R_{b(m-1)}^{g(m-1)}\Delta V_1 \\ \Delta V'_2 = \int_{t_{m-1}+T/2}^{t_m} R_{b(m-1)}^{g(m-1)} f^b(\tau)d\tau = R_{b(m-1)}^{g(m-1)}\Delta V_2 \\ \Delta\theta' = \int_{t_{m-1}}^{t_m} \omega_{ag}^g(\tau)d\tau = \Delta\theta'_1 + \Delta\theta'_2 \\ \Delta V' = \int_{t_{m-1}}^{t_m} R_{b(m-1)}^{g(m-1)} f^b(\tau)d\tau = R_{b(m-1)}^{g(m-1)}\Delta V \end{cases}$$

where, a two-subsample velocity rotation error compensation algorithm is as follows:

$$\Delta V_{rot(m)} = \frac{1}{2}\Delta\theta \times \Delta V$$

$$\Delta V'_{rot(m)} = \frac{1}{2}\Delta\theta' \times \Delta V'$$

a two-subsample velocity scull error compensation algorithm is as follows:

$$\Delta V_{scul(m)} = \frac{2}{3}(\Delta\theta_1 \times \Delta V_2 + \Delta V_1 \times \Delta\theta_2)$$

$$\Delta V'_{scul(m)} = \frac{2}{3}(\Delta\theta'_1 \times \Delta V'_2 + \Delta V'_1 \times \Delta\theta'_2)$$

and $$\Delta V'_{rot(m)} + \Delta V'_{scul(m)} \approx \frac{T}{6}\omega_{ag}^g \times [R_{b(m-1)}^{g(m-1)}(\Delta V_1 + 5\Delta V_2)]$$

where, the complete algorithm of the specific force velocity increment in the g frame is as follows:

$$\Delta V_{sf(m)}^g = R_{b(m-1)}^{g(m-1)}\Delta V - \frac{T}{6}\omega_{ag}^g \times [R_{b(m-1)}^{g(m-1)}(\Delta V_1 + 5\Delta V_2)] + R_{b(m-1)}^{g(m-1)}(\Delta V_{rot(m)} + \Delta V_{scul(m)})$$

step 5: performing position update on the SSM, including the following sub-steps:

step 5-1: obtaining the following equation from the velocity navigation equation in step 2:

$$\dot{P}^g(t)=V^g(t)$$

where $$V^g(t) = V_{m-1}^g + \Delta V_{sf}^g(t) + \Delta V_{cor/g}^g \frac{t-t_{m-1}}{T} (t_{m-1} \le t \le t_m);$$

step 5-2: integrating both sides of $V^g(t)$ in step 5-1 in $[t_{m-1}, t_m]$ to obtain:

$$P_m^g = P_{m-1}^g + \left[V_{m-1}^g + \frac{1}{2}\Delta V_{cor/g(m)}^g\right]T + \Delta P_{sf(m)}^g$$

where, $P_m^g$ and $P_{m-1}^g$ are positions of the SSM in the g frame at $t_m$ and $t_{m-1}$;

$$\Delta P_{sf(m)}^g = R_{b(m-1)}^{g(m-1)}(S_{\Delta vm} + \Delta P_{rotm} + \Delta P_{sclm}) - (\Delta P'_{rotm} + \Delta P'_{sclm})$$

and $$S_{\Delta vm} = T\left[\frac{5}{6}\Delta V_1 + \frac{1}{6}\Delta V_2\right]$$

indicates a secondary integral increment of a specific force;

$$\Delta P_{rotm} = T\left(\Delta\theta_1 \times \left[\frac{5}{18}\Delta V_1 + \frac{1}{6}\Delta V_2\right] + \Delta\theta_2 \times \left[\frac{1}{6}\Delta V_1 + \frac{1}{18}\Delta V_2\right]\right)$$

$$\Delta P'_{rotm} = T\left(\Delta\theta'_1 \times \left[\frac{5}{18}\Delta V'_1 + \frac{1}{6}\Delta V'_2\right] + \Delta\theta'_2 \times \left[\frac{1}{6}\Delta V'_1 + \frac{1}{18}\Delta V'_2\right]\right)$$

indicates a rotation effect compensation quantity in position calculation;

$$\Delta P_{sclm} = T\left(\Delta\theta_1 \times \left[\frac{11}{90}\Delta V_1 + \frac{1}{10}\Delta V_2\right] + \Delta\theta_2 \times \left[\frac{1}{90}\Delta V_2 - \frac{7}{30}\Delta V_1\right]\right)$$

-continued $$\Delta P'_{scrlm} = T\left(\Delta \theta'_1 \times \left[\frac{11}{90}\Delta V'_1 + \frac{1}{10}\Delta V'_2\right] + \Delta \theta'_2 \times \left[\frac{1}{90}\Delta V'_2 - \frac{7}{30}\Delta V'_1\right]\right)$$

indicates a scroll effect compensation quantity in position calculation;

step 5-3: finally obtaining the complete algorithm of the $\Delta P_{sf(m)}^g$ position increment in the g frame:

$$\Delta P_{sf(m)}^g = R_{b(m-1)}^{g(m-1)}(S_{\Delta vm} + \Delta P_{rotm} + \Delta P_{scrlm}) - \frac{T^2}{6}\omega_{ag}^g \times (R_{b(m-1)}^{g(m-1)}[\Delta V_1 + \Delta V_2])$$

according to the result in step 5-2 and $$\Delta P'_{rotm} + \Delta P'_{scrlm} \approx \frac{T^2}{6}\omega_{ag}^g \times (R_{b(m-1)}^{g(m-1)}[\Delta V_1 + \Delta V_2])$$

thus completing the updates of the strapdown inertial navigation solutions in terms of attitude, velocity and position of the SSM in the g frame.

The present invention has the following beneficial effects.

In the present invention, the attitude and position of the SSM in the g frame calculated by the method are consistent with the data of the flight control and guidance system. This method uses an angular increment and a velocity increment to complete the update of the strapdown inertial navigation solutions. It takes into account the linear and angular vibrations of the SSM in flight, and compensates for the calculation of a cone error, a scull error and a scroll error. In this way, the method reduces the errors of data between the SSM and the system, and improves the hit rate of the SSM.

BRIEF DESCRIPTION OF DRAWINGS

FIG. 1: Mechanization of strapdown inertial navigation in an LCEF frame.

DETAILED DESCRIPTION

Referring to FIG. 1, coordinate systems in the present invention are defined as follows:

1) Earth-centered inertial (ECI) frame (i frame).
2) Earth-centered earth-fixed (ECEF) frame (e frame).
3) Body frame (b frame), which is a forward-up-right body frame. A surface-to-surface missile (SSM) serves as a body in the present invention.
4) Launch-centered earth-fixed (LCEF) frame (g frame). An origin of coordinates o is at a launch point; ox is in a horizontal plane of the launch point, and points to a launch aiming direction; oy is along a vertical direction of the launch point; oxyz is a right-handed coordinate system. The g frame is fixed on the earth and rotates with the earth.
5) Launch-centered inertial (LCI) frame (a frame), which coincides with the g frame at the moment of launching, and then remains unchanged in an inertial space.

The method for updating strapdown inertial navigation solutions of the SSM based on the g frame includes attitude update, velocity update and position update.

Step 1: Calculate a corresponding rotation vector according to a gyroscope triad angular increment of the SSM in an update period T, a rotational angular velocity $\omega_{ag}^g$ of the g frame (g frame) relative to the LCI frame (a frame) and the update period T; calculate a corresponding quaternion according to a relationship between the rotation vector and the quaternion; finally, complete attitude update by an quaternion recursion equation.

Step 2: Calculate a velocity increment of a harmful acceleration according to a velocity $V_{m-1}^g$ of the SSM at a previous moment, the rotational angular velocity $\omega_{ag}^g$ of the g frame relative to the a frame and a gravity $g^g$ of the SSM; calculate a specific force velocity increment according to the gyroscope triad angular increment and an accelerometer triad velocity increment of the SSM in the update period; add to the velocity $V_{m-1}^g$ of the previous moment to complete velocity update.

Step 3: Calculate an integral of the velocity $V_{m-1}^g$ of the previous moment and the velocity increment of the harmful acceleration obtained in step 2 with T; calculate an integral of the specific force velocity increment based on the angular increment and velocity increment in the update period; finally, sum the integral and a position $P_{m-1}^g$ of the missile at the previous moment to complete position update.

The algorithm of the present invention is described in detail below.

A navigation equation in the g frame is expressed as:

$$\begin{bmatrix} \dot{P}^g \\ \dot{V}^g \\ \dot{R}_b^g \end{bmatrix} = \begin{bmatrix} V^g \\ R_b^g f^b - 2\Omega_{ag}^g V^g + g^g \\ R_b^g (\Omega_{ab}^b - \Omega_{ag}^b) \end{bmatrix} \quad (1.1)$$

In the equation, $P^g$, $V^g$ and $R_b^g$ are position, velocity and attitude matrices of the SSM in the g frame, and the corresponding equations are position, velocity and attitude navigation equations; $f^b$ is a measured value of an accelerometer triad; $g^g$ is a gravity of the SSM in the g frame; $\omega_{ab}^b$ is an anti-symmetric matrix corresponding to a measured value $\omega_{ab}^b$ of a gyroscope triad; and $\omega_{ag}^b$ is an anti-symmetric matrix corresponding to the rotational angular velocity $\omega_{ag}^b$ of the g frame relative to the a frame.

(1) Attitude Update

The attitude navigation equation is resolved using a quaternion method; a numerical recursion of an attitude update quaternion equation is performed:

$$q_{b(m)}^{g(m)} = q_{g(m-1)}^{g(m)} q_{b(m-1)}^{g(m-1)} q_{b(m)}^{b(m-1)} \quad (1.2)$$

In the equation, $q_{b(m-1)}^{g(m-1)}$ is a transformation quaternion from the b frame to the g frame at a $t_{m-1}$ moment, that is, an attitude quaternion at $t_{m-1}$; $q_{b(m)}^{g(m)}$ is an attitude quaternion at a $t_m$ moment; $q_{g(m-1)}^{g(m)}$ is a transformation quaternion of the g frame from $t_{m-1}$ to $t_m$; $q_{b(m)}^{b(m-1)}$ is a transformation quaternion calculated from the angular increment from $t_{m-1}$ to $t_m$.

Because there is a non-commutative error of rotation when the rigid body makes limited rotation, an equivalent rotation vector method is used. When the angular increment is used to calculate an equivalent vector, this non-commutative error is appropriately compensated, and the rotation vector algorithm is used to obtain an optimized algorithm in a cone motion environment. The calculation method is as follows:

(1) The calculation of $q_{g(m-1)}^{g(m)}$ uses the rotational angular velocity $\omega_{ag}^g(t)$ ($t_{m-1} \leq t \leq t_m$); $t_m - t_{m-1} = T$, and the equivalent rotation vector of the g frame from $t_{m-1}$ to $t_m$ is $\zeta_m$:

$$\zeta_m = \int_{t_{m-1}}^{t_m} \omega_{ag}^g(t) dt \approx \omega_{ag}^g T \quad (1.3)$$

(2) The calculation of $q_{b(m)}^{b(m-1)}$ uses the rotational angular velocity $\omega_{ab}^b(t)$, which is the angular velocity measured by the gyroscope triad; the equivalent rotation vector of the body frame relative to the inertial frame from the $t_{m-1}$ moment to $t_m$ is $\Phi_m$:

$$\Phi_m = \int_{t_{m-1}}^{t_m} \omega_{ab}^b(t)dt \qquad (1.4)$$

In an actual project, the angular increment measured by the gyroscope triad is used to calculate:

$$\Phi_m = \Delta\theta_1 + \Delta\theta_2 + \tfrac{2}{3}(\Delta\theta_1 \times \Delta\theta_2) \qquad (1.5)$$

In the equation, $$\Delta\theta_1 = \int_{t_{m-1}}^{t_{m-1}+\frac{T}{2}} \omega_{ab}^b(\tau)d\tau, \; \Delta\theta_2 = \int_{t_{m-1}+\frac{T}{2}}^{t_m} \omega_{ab}^b(\tau)d\tau.$$

The rotation vector $\Phi$ and the corresponding quaternion $q(h)$ have the following calculation relationship:

$$q(h) = \cos\frac{\Phi}{2} + \frac{\Phi}{\Phi}\sin\frac{\Phi}{2} \qquad (1.6)$$

The quaternions $q_{g(m-1)}^{g(m)}$ and $q_{b(m)}^{b(m-1)}$ corresponding to $\zeta_m$ and $\Phi_m$ are calculated respectively, and are substituted into (1.2) to complete attitude update.

(2) Velocity Update

The velocity navigation equation is integrated over a period $[t_{m-1}, t_m]$ to obtain the following recursive form $$V_m^g = V_{m-1}^g + \Delta V_{sf(m)}^g + \Delta V_{cor/g(m)}^g \qquad (1.7)$$

In the equation, $V_m^g$ and $V_{m-1}^g$ are the velocity of the SSM in the g frame at $t_m$ and $t_{m-1}$, and $$\Delta V_{sf(m)}^g = \int_{t_{m-1}}^{t_m} R_b^g(t) f^b(t) dt \qquad (1.8)$$

$$\Delta V_{cor/g(m)}^g = \int_{t_{m-1}}^{t_m} [-2\omega_{ag}^g(t) \times V^g(t) + g^g(t)] dt \qquad (1.9)$$

$\Delta V_{sf(m)}^g$ and $\Delta V_{cor/g(m)}^g$ are respectively the specific force velocity increment and the velocity increment of the harmful acceleration of the navigation coordinate system in period $T = t_m - t_{m-1}$.

The integrand of $\Delta V_{cor/g(m)}$ is a slow time-varying variable, and the value at $t_{m-1/2} = (t_{m-1} - t_m)$ is used to approximate equation (1.9) as:

$$\Delta V_{cor/g(m)}^g = [-2\omega_{ag(m-1/2)}^g \times V_{m-1/2}^g + g_{g(m-1/2)}^g] T \qquad (1.10)$$

The specific force velocity increment $\Delta V_{sf(m)}^g$ is calculated by matrix chain multiplication and decomposition and approximate expansion:

$$\Delta V_{sf(m)}^g = R_{b(m-1)}^{g(m-1)} \Delta V + R_{b(m-1)}^{g(m-1)} (\Delta V_{rot(m)} + \Delta V_{scul(m)}) - (\Delta V'_{rot(m)} + \Delta V'_{scul(m)}) \qquad (1.11)$$

$R_{b(m-1)}^{g(m-1)}$ is the attitude matrix at $t_{m-1}$; $\Delta V$ is the integral of the measured value of the accelerometer triad in T; and $\Delta V_{rot(m)}$ and $\Delta V'_{rot(m)}$ are rotation error compensation quantities of velocity, which are caused due to the spatial rotation change of a specific force direction during the resolving period; $\Delta V_{scul(m)}$ and $\Delta V'_{scul(m)}$ are scull error compensation quantities.

$\Delta V_{scul(m)}$ is expressed by the angular velocity increment and the velocity increment at $t_{m-1/2}$ and $t_m$:

$$\begin{cases} \Delta\theta_1 = \int_{t_{m-1}}^{t_{m-1}+T/2} \omega_{ab}^b(\tau) d\tau \\ \Delta\theta_2 = \int_{t_{m-1}+T/2}^{t_m} \omega_{ab}^b(\tau) d\tau \\ \Delta V_1 = \int_{t_{m-1}}^{t_{m-1}+T/2} f^b(\tau) d\tau \\ \Delta V_2 = \int_{t_{m-1}+T/2}^{t_m} f^b(\tau) d\tau \\ \Delta\theta = \int_{t_{m-1}}^{t_m} \omega_{ab}^b(\tau) d\tau \\ \Delta V = \int_{t_{m-1}}^{t_m} f^b(\tau) d\tau \end{cases}$$

$$\begin{cases} \Delta\theta'_1 = \int_{t_{m-1}}^{t_{m-1}+T/2} \omega_{ag}^g(\tau) d\tau \approx \frac{T}{2}\omega_{ag}^g \\ \Delta\theta'_2 = \int_{t_{m-1}+T/2}^{t_m} \omega_{ag}^g(\tau) d\tau \approx \frac{T}{2}\omega_{ag}^g \\ \Delta V'_1 = \int_{t_{m-1}}^{t_{m-1}+T/2} R_{b(m-1)}^{g(m-1)} f^b(\tau) d\tau = R_{b(m-1)}^{g(m-1)} \Delta V_1 \\ \Delta V'_2 = \int_{t_{m-1}+T/2}^{t_m} R_{b(m-1)}^{g(m-1)} f^b(\tau) d\tau = R_{b(m-1)}^{g(m-1)} \Delta V_2 \\ \Delta\theta' = \int_{t_{m-1}}^{t_m} \omega_{ag}^g(\tau) d\tau = \Delta\theta'_1 + \Delta\theta'_2 \\ \Delta V' = \int_{t_{m-1}}^{t_m} R_{b(m-1)}^{g(m-1)} f^b(\tau) d\tau = R_{b(m-1)}^{g(m-1)} \Delta V \end{cases}$$

A two-subsample velocity rotation error compensation algorithm is:

$$\Delta V_{rot(m)} = \frac{1}{2} \Delta\theta \times \Delta V \qquad (1.12)$$

$$\Delta V'_{rot(m)} = \frac{1}{2} \Delta\theta' \times \Delta V' \qquad (1.13)$$

A two-subsample scull error compensation algorithm is:

$$\Delta V_{scul(m)} = \frac{2}{3} (\Delta\theta_1 \times \Delta V_2 + \Delta V_1 \times \Delta\theta_2) \qquad (1.14)$$

$$\Delta V'_{scul(m)} = \frac{2}{3} (\Delta\theta'_1 \times \Delta V'_2 + \Delta V'_1 \times \Delta\theta'_2) \qquad (1.15)$$

and $$\Delta V'_{rot(m)} + \Delta V'_{scul(m)} \approx \frac{T}{6} \omega_{ag}^g \times [R_{b(m-1)}^{g(m-1)}(\Delta V_1 + 5\Delta V_2)] \qquad (1.16)$$

Thus, the complete algorithm of the specific force velocity increment in the g frame is obtained, that is, Equation (1.11) can be expressed as:

$$\Delta V_{sf(m)}^g = R_{b(m-1)}^{g(m-1)} \Delta V - \frac{T}{6} \omega_{ag}^g \times [R_{b(m-1)}^{g(m-1)}(\Delta V_1 + 5\Delta V_2)] + R_{b(m-1)}^{g(m-1)}(\Delta V_{rot(m)} + \Delta V_{scul(m)}) \qquad (1.17)$$

(3) Position Update

According to the position navigation equation, the following equation is obtained:

$$\dot{P}^g(t) = V^g(t) \tag{1.10}$$

Due to the short time period $[t_{m-1}, t_m]$, the velocity compensation term of the harmful acceleration changes very slowly during this time period, and its integral can be approximated as a linear function of time. According to Equation (1.7), both sides of (1.21) are integrated in $[t_{m-1}, t_m]$:

$$V^g(t) = V^g_{m-1} + \Delta V^g_{sf}(t) + \Delta V^g_{cor/g} \frac{t - t_{m-1}}{T} (t_{m-1} \le t \le t_m) \tag{1.21}$$

to obtain:

$$P^g_m = P^g_{m-1} + \left[V^g_{m-1} + \frac{1}{2}\Delta V^g_{cor/g(m)}\right]T + \Delta P^g_{sf(m)} \tag{1.22}$$

In the equation, $P^g_m$ and $P^g_{m-1}$ are the position of the SSM in the g frame at $t_m$ and $t_{m-1}$.

$$\Delta P^g_{sf(m)} = R^{g(m-1)}_{b(m-1)}(S_{\Delta vm} + \Delta P_{rotm} + \Delta P_{scrlm}) - (\Delta P'_{rotm} + \Delta P'_{scrlm}) \tag{1.23}$$

And:

$$S_{\Delta vm} = T\left[\frac{5}{6}\Delta V_1 + \frac{1}{6}\Delta V_2\right] \tag{1.24}$$

indicates a secondary integral increment of the specific force.

$$\Delta P_{rotm} = T\left(\Delta\theta_1 \times \left[\frac{5}{18}\Delta V_1 + \frac{1}{6}\Delta V_2\right] + \Delta\theta_2 \times \left[\frac{1}{6}\Delta V_1 + \frac{1}{18}\Delta V_2\right]\right) \tag{1.25}$$

$$\Delta P'_{rotm} = \tau\left(\Delta\theta'_1 \times \left[\frac{5}{18}\Delta V'_1 + \frac{1}{6}\Delta V'_2\right] + \Delta\theta'_2 \times \left[\frac{1}{6}\Delta V'_1 + \frac{1}{18}\Delta V'_2\right]\right) \tag{1.26}$$

indicates a rotation effect compensation quantity in position calculation.

$$\Delta P_{scrlm} = T\left(\Delta\theta_1 \times \left[\frac{11}{90}\Delta V_1 + \frac{1}{10}\Delta V_2\right] + \Delta\theta_2 \times \left[\frac{1}{90}\Delta V_2 - \frac{7}{30}\Delta V_1\right]\right) \tag{1.27}$$

$$\Delta P'_{scrlm} = T\left(\Delta\theta'_1 \times \left[\frac{11}{90}\Delta V'_1 + \frac{1}{10}\Delta V'_2\right] + \Delta\theta'_2 \times \left[\frac{1}{90}\Delta V'_2 - \frac{7}{30}\Delta V'_1\right]\right) \tag{1.28}$$

indicates a scroll effect compensation quantity in position calculation. And $$\Delta P'_{rotm} + \Delta P'_{scrlm} \approx \frac{T^2}{6}\omega^g_{ag} \times \left(R^{g(m-1)}_{b(m-1)}[\Delta V_1 + \Delta V_2]\right) \tag{1.29}$$

Thus, the complete algorithm of the $\Delta P^g_{sf(m)}$ position increment in the g frame is obtained:

$$\Delta P^g_{sf(m)} = R^{g(m-1)}_{b(m-1)}(S_{\Delta vm} + \Delta P_{rotm} + \Delta P_{scrlm}) - \frac{T^2}{6}\omega^g_{ag} \times \left(R^{g(m-1)}_{b(m-1)}[\Delta V_1 + \Delta V_2]\right). \tag{1.30}$$

What is claimed is:

1. A method for updating strapdown inertial navigation solutions using a launch-centered earth-fixed (LCEF) frame (g frame), comprising the following steps:

step 1: using a surface-to-surface missile (SSM) as a body to establish a relative relationship between the SSM and a ground to keep identical missile parameters required by a missile control and guidance system, and establishing a body frame (b frame), which points front, top, and right;

step 2: expressing a navigation equation in the g frame as:

$$\begin{bmatrix} \dot{P}^g \\ \dot{V}^g \\ \dot{R}^g_b \end{bmatrix} = \begin{bmatrix} V^g \\ R^g_b f^b - 2\Omega^g_{ag} V^g + g^g \\ R^g_b(\Omega^b_{ab} - \Omega^b_{ag}) \end{bmatrix}$$

wherein, $P^g$, $V^g$ and $R^g_b$ are position, velocity and attitude matrices of the body in the g frame, and corresponding equations are position, a velocity navigation equation and an attitude navigation equation; $f^b$ is a measured value of an accelerometer triad; $g^g$ is a gravity of the body in the g frame; $\Omega^b_{ab}$ is an anti-symmetric matrix corresponding to a measured value $\omega^b_{ab}$ of a gyroscope triad; $\Omega^b_{ag}$ is an anti-symmetric matrix corresponding to a rotational angular velocity $\omega^b_{ab}$ of the g frame relative to an a frame;

step 3: performing attitude update on the SSM, comprising the following sub-steps:

step 3-1: resolving the attitude navigation equation in step 2 by a quaternion method:

$$q_{b(m)}^{g(m)} = q_{g(m-1)}^{g(m)} q_{b(m-1)}^{g(m-1)} q_{b(m)}^{g(m-1)}$$

where, $q_{b(m-1)}^{g(m-1)}$ is a transformation quaternion from the b frame to the g frame at a $t_{m-1}$ moment, that is, an attitude quaternion at $t_{m-1}$; $q_{b(m)}^{g(m)}$ is an attitude quaternion at $t_m$; $q_{g(m-1)}^{g(m)}$ is a transformation quaternion of the g frame from $t_{m-1}$ to $t_m$; $q_{b(m)}^{b(m-1)}$ is a transformation quaternion calculated from an angular increment from $t_{m-1}$ to $t_m$;

step 3-2: calculating with an equivalent rotation vector method, wherein an equivalent rotation vector $\zeta_m$ of the g frame from $t_{m-1}$ to $t_m$ is expressed as:

$$\varsigma_m = \int_{t_{m-1}}^{t_m} \omega^g_{ag}(t)dt \approx \omega^g_{ag}T$$

an equivalent rotation vector $\Phi_m$ of the body frame relative to an inertial frame from $t_{m-1}$ to $t_m$ is expressed as:

$$\Phi_m = \int_{t_{m-1}}^{t_m} \omega^b_{ab}(t)dt$$

step 3-3: applying the angular increment measured by the gyroscope triad to an actual project to calculate:

$$\Phi_m = \Delta\theta_1 + \Delta\theta_2 + \frac{2}{3}(\Delta\theta_1 \times \Delta\theta_2) \quad (0.1)$$

wherein $$\Delta\theta_1 = \int_{t_{m-1}}^{t_{m-1}+\frac{T}{2}} \omega_{ab}^b(\tau)d\tau, \; \Delta\theta_2 = \int_{t_{m-1}+\frac{T}{2}}^{t_m} \omega_{ab}^b(\tau)d\tau;$$

a rotation vector $\Phi$ and a corresponding quaternion q(h) have the following calculation relationship:

$$q(h) = \cos\frac{\Phi}{2} + \frac{\Phi}{\Phi}\sin\frac{\Phi}{2} \quad (0.2)$$

therefore, quaternions $q_{g(m-1)}^{g(m)}$ and $q_{b(m)}^{b(m-1)}$ corresponding to $\zeta_m$ and $\Phi_m$ are obtained, and substituted into $q_{b(m)}^{g(m)} = q_{g(m-1)}^{g(m)} q_{b(m-1)}^{g(m-1)} q_{b(m)}^{b(m-1)}$ to complet attitude update;

step 4: performing velocity update on the SSM, comprising the following sub-steps:

step 4-1: integrating the velocity navigation equation in step 2 over a period $[t_{m-1}, t_m]$:

$$V_m^g = V_{m-1}^g + \Delta V_{sf(m)}^g + \Delta V_{cor/g(m)}^g$$

wherein, $V_m^g$ and $V_{m-1}^g$ are velocities of the SSM in the g frame at $t_m$ and $t_{m-1}$; $\Delta V_{sf(m)}^g$ and $\Delta V_{cor/g(m)}^g$ are a specific force velocity increment and a velocity increment of a harmful acceleration of a navigation coordinate system in the period $T = t_m - t_{m-1}$;

Step 4-2: substituting $\Delta V_{cor/g(m)}^g$ with a value at $t_{m-1/2} = (t_{m-1}+t_m)/2$:

$$\Delta V_{cor/g(m)}^g \approx [-2\omega_{ag(m-1/2)}^g \times V_{m-1/2}^g + g_{m-1/2}^g]T;$$

performing matrix chain multiplication and decomposition on $\Delta V_{sf(m)}^g$:

$$\Delta V_{sf(m)}^g = R_{b(m-1)}^{g(m-1)}\Delta V + R_{b(m-1)}^{g(m-1)}(\Delta V_{rot(m)} + \Delta V_{scul(m)}) - (\Delta V'_{rot(m)} + \Delta V'_{scul(m)})$$

wherein, $R_{b(m-1)}^{g(m-1)}$ is an attitude matrix at $t_{m-1}$; $\Delta V$ is an integral of a measured value of the accelerometer triad in T; $\Delta V_{rot(m)}$ and $\Delta V'_{rot(m)}$ are rotation error compensation quantities of velocity; $\Delta V_{scul(m)}$ and $\Delta V'_{scul(m)}$ are scull error compensation quantities;

step 4-3: expressing $\Delta V_{sf(m)}^g$ by an angular velocity increment and a velocity increment at $t_{m-1/2}$ and $t_m$, and setting:

$$\begin{cases} \Delta\theta_1 = \int_{t_{m-1}}^{t_{m-1}+T/2} \omega_{ab}^b(\tau)d\tau \\ \Delta\theta_2 = \int_{t_{m-1}+T/2}^{t_m} \omega_{ab}^b(\tau)d\tau \\ \Delta V_1 = \int_{t_{m-1}}^{t_{m-1}+T/2} f^b(\tau)d\tau \\ \Delta V_2 = \int_{t_{m-1}+T/2}^{t_m} f^b(\tau)d\tau \\ \Delta\theta = \int_{t_{m-1}}^{t_m} \omega_{ab}^b(\tau)d\tau \\ \Delta V = \int_{t_{m-1}}^{t_m} f^b(\tau)d\tau \end{cases}$$

$$\begin{cases} \Delta\theta'_1 = \int_{t_{m-1}}^{t_{m-1}+T/2} \omega_{ag}^g(\tau)d\tau \approx \frac{T}{2}\omega_{ag}^g \\ \Delta\theta'_2 = \int_{t_{m-1}+T/2}^{t_m} \omega_{ag}^g(\tau)d\tau \approx \frac{T}{2}\omega_{ag}^g \\ \Delta V'_1 = \int_{t_{m-1}}^{t_{m-1}+T/2} R_{b(m-1)}^{g(m-1)} f^b(\tau)d\tau = R_{b(m-1)}^{g(m-1)}\Delta V_1 \\ \Delta V'_2 = \int_{t_{m-1}+T/2}^{t_m} R_{b(m-1)}^{g(m-1)} f^b(\tau)d\tau = R_{b(m-1)}^{g(m-1)}\Delta V_2 \\ \Delta\theta' = \int_{t_{m-1}}^{t_m} \omega_{ag}^g(\tau)d\tau = \Delta\theta'_1 + \Delta\theta'_2 \\ \Delta V' = \int_{t_{m-1}}^{t_m} R_{b(m-1)}^{g(m-1)} f^b(\tau)d\tau = R_{b(m-1)}^{g(m-1)}\Delta V \end{cases}$$

wherein, a two-subsample velocity rotation error compensation algorithm is as follows:

$$\Delta V_{rot(m)} = \frac{1}{2}\Delta\theta \times \Delta V$$

$$\Delta V'_{rot(m)} = \frac{1}{2}\Delta\theta' \times \Delta V'$$

a two-subsample velocity scull error compensation algorithm is as follows:

$$\Delta V_{scul(m)} = \frac{2}{3}(\Delta\theta_1 \times \Delta V_2 + \Delta V_1 \times \Delta\theta_2)$$

$$\Delta V'_{scul(m)} = \frac{2}{3}(\Delta\theta'_1 \times \Delta V'_2 + \Delta V'_1 \times \Delta\theta'_2)$$

and $$\Delta V'_{rot(m)} + \Delta V'_{scul(m)} \approx \frac{T}{6}\omega_{ag}^g \times [R_{b(m-1)}^{g(m-1)}(\Delta V_1 + 5\Delta V_2)]$$

wherein, a complete algorithm of the specific force velocity increment in the g frame is as follows:

$$\Delta V_{sf(m)}^g = R_{b(m-1)}^{g(m-1)}\Delta V - \frac{T}{6}\omega_{ag}^g \times [R_{b(m-1)}^{g(m-1)}(\Delta V_1 + 5\Delta V_2)] + R_{b(m-1)}^{g(m-1)}(\Delta V_{rot(m)} + \Delta V_{scul(m)})$$

step 5: performing position update on the SSM, comprising the following sub-steps:

step 5-1: obtaining the following equation from the velocity navigation equation in step 2:

wherein $$V^g(t) = V_{m-1}^g + \Delta V_{sf}^g(t) + \Delta V_{cor/g}^g \frac{t-t_{m-1}}{T}, \text{ and } t_{m-1} \le t \le t_m;$$

step 5-2: integrating both sides of $V^g(t)$ in step 5-1 in $[t_{m-1}, t_m]$ to obtain:

$$P_m^g = P_{m-1}^g + \left[V_{m-1}^g + \frac{1}{2}\Delta V_{cor/g(m)}^g\right]T + \Delta P_{sf(m)}^g$$

wherein, $P_m^g$ and $P_{m-1}^g$ are positions of the SSM in the g frame at $t_m$ and $t_{m-1}$;

$$\Delta P_{sf(m)}^g = R_{b(m-1)}^{g(m-1)}(S_{\Delta vm} + \Delta P_{rotm} + \Delta P_{scrlm}) - (\Delta P'_{rotm} + \Delta P'_{scrlm})$$

$$S_{\Delta vm} = T\left[\frac{5}{6}\Delta V_1 + \frac{1}{6}\Delta V_2\right]$$

indicates a secondary integral of a specific force;

$$\Delta P_{rotm} = T\left(\Delta\theta_1 \times \left[\frac{5}{18}\Delta V_1 + \frac{1}{6}\Delta V_2\right] + \Delta\theta_2 \times \left[\frac{1}{6}\Delta V_1 + \frac{1}{18}\Delta V_2\right]\right)$$

$$\Delta P'_{rotm} = T\left(\Delta\theta'_1 \times \left[\frac{5}{18}\Delta V'_1 + \frac{1}{6}\Delta V'_2\right] + \Delta\theta'_2 \times \left[\frac{1}{6}\Delta V'_1 + \frac{1}{18}\Delta V'_2\right]\right)$$

indicates a rotation effect compensation quantity in position calculation;

$$\Delta P_{scrlm} = T\left(\Delta\theta_1 \times \left[\frac{11}{90}\Delta V_1 + \frac{1}{10}\Delta V_2\right] + \Delta\theta_2 \times \left[\frac{1}{90}\Delta V_2 - \frac{7}{30}\Delta V_1\right]\right)$$

$$\Delta P'_{scrlm} = T\left(\Delta\theta'_1 \times \left[\frac{11}{90}\Delta V'_1 + \frac{1}{10}\Delta V'_2\right] + \Delta\theta'_2 \times \left[\frac{1}{90}\Delta V'_2 - \frac{7}{30}\Delta V'_1\right]\right)$$

indicates a scroll effect compensation quantity in position calculation;

step 5-3: finally obtaining a complete algorithm of the $\Delta P_{sf(m)}^g$ position increment in the g frame:

$$\Delta P_{sf(m)}^g = R_{b(m-1)}^{g(m-1)}(S_{\Delta vm} + \Delta P_{rotm} + \Delta P_{scrlm}) - \frac{T^2}{6}\omega_{ag}^g \times \left(R_{b(m-1)}^{g(m-1)}[\Delta V_1 + \Delta V_2]\right)$$

according to the result in step 5-2 and $$\Delta P'_{rotm} + \Delta P'_{scrlm} \approx \frac{T^2}{6}\omega_{ag}^g \times \left(R_{b(m-1)}^{g(m-1)}[\Delta V_1 + \Delta V_2]\right)$$

by utilizing the angular increment, velocity increment, and linear and angular vibrations of the SSM in flight, the strapdown inertial navigation solutions are updated in terms of attitude, velocity, and position in the g frame, thereby reducing data errors between the SSM and missile guidance and control systems in order to increase the SSM's hit rate.

* * * * *